US011903375B2

(12) United States Patent
Buchanan-Phillips

(10) Patent No.: US 11,903,375 B2
(45) Date of Patent: Feb. 20, 2024

(54) METHOD OF ERADICATING BED BUGS AND ALCOHOL SPRAY THEREFOR

(71) Applicant: Annette Buchanan-Phillips, Cleveland, OH (US)

(72) Inventor: Annette Buchanan-Phillips, Cleveland, OH (US)

(*) Notice: Subject to any disclaimer, the term of this patent is extended or adjusted under 35 U.S.C. 154(b) by 215 days.

(21) Appl. No.: 17/644,462

(22) Filed: Dec. 15, 2021

(65) Prior Publication Data

US 2023/0180736 A1  Jun. 15, 2023

(51) Int. Cl.
*A01M 1/20* (2006.01)

(52) U.S. Cl.
CPC ............ *A01M 1/20* (2013.01); *A01M 1/2011* (2013.01); *A01M 1/2027* (2013.01)

(58) Field of Classification Search
CPC ..... A01M 1/20; A01M 1/2011; A01M 1/2027
See application file for complete search history.

(56) References Cited

U.S. PATENT DOCUMENTS

| 2011/0213038 A1* | 9/2011 | Bedoukian | A01N 31/02 514/739 |
| 2012/0294922 A1* | 11/2012 | Nimocks | A01N 53/00 428/354 |
| 2014/0208636 A1* | 7/2014 | Black | A01M 13/003 43/132.1 |
| 2020/0068878 A1* | 3/2020 | Gordon | A01N 25/02 |

* cited by examiner

Primary Examiner — Richard G Davis
(74) Attorney, Agent, or Firm — Dunlap Bennett & Ludwig, PLLC; Anna L. Kinney

(57) ABSTRACT

A method of treating an area infested with bed bugs, includes applying to the infested area an amount of an isopropyl alcohol-denatured alcohol blend effective to kill the bed bugs. The alcohol blend composition is a bed bug control composition including, 25 vol. % to 33 vol. % denatured alcohol and 66 vol. % to 75 vol. % isopropyl alcohol.

7 Claims, 2 Drawing Sheets

METHOD OF ERADICATING BED BUGS AND ALCOHOL SPRAY THEREFOR

BACKGROUND OF THE INVENTION

The present invention relates to a pesticide effective to control bed bugs and, more particularly, to a method of eradicating bed bugs with an alcohol spray.

Bed bugs are an increasing concern. For instance, hotels and motels can have significant problems with bed bugs. Currently available compositions and methods of treatment are ineffective. For example, Harris® Bed Bug Killer, a pesticide containing 0.03% Deltamethrin, and Orkin® pest control treatment, have failed to eliminate bed bugs and are expensive.

As can be seen, there is a need for a composition that cheaply and effectively eliminates bed bugs.

SUMMARY OF THE INVENTION

In one aspect of the present invention, a method of treating an area infested with bed bugs, comprising applying to the infested area an amount of an isopropyl alcohol-denatured alcohol blend effective to kill the bed bugs.

In another aspect of the present invention, a bed bug control composition comprising, in volume percentages based on a total volume of the bed bug control composition, 25% to 33% denatured alcohol and 66% to 75% isopropyl alcohol.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a method of eradicating bed bugs in an infested area with an effective amount of an alcohol spray. Another embodiment of the present invention is a bed bug control composition comprising an isopropyl alcohol-denatured alcohol blend.

The composition and method of the present invention is also believed to destroy the virus that causes coronavirus disease 2019 (COVID-19) in treatment areas.

Denatured alcohol is ethanol, $C_2H_5OH$, with additives designed to discourage consumption of the alcohol. Ethanol is known to kill soft-bodied insects such as aphids and mealybugs.

Isopropyl alcohol, $C_3H_7OH$, is known for use in combination with pesticide active ingredients to kill insects such as fleas and ticks.

To make an alcohol spray according to the present invention, the user may mix 1 part by volume denatured alcohol to two parts by volume of a total volume 91 vol. % isopropyl alcohol in a bottle. In some cases, the mixture may be 1 part denatured alcohol to 3 parts 91% isopropyl alcohol. In some embodiments, the denatured alcohol and the isopropyl alcohol may be the only pesticidal ingredients or may even be the only ingredients in the composition.

To use the inventive alcohol spray, the user may spray the mix on infested areas, such as on base boards and furniture, and directly on any visible bed bugs. The alcohol mix has been shown to eliminate bed bugs for 6 months.

As a liquid suitable for spraying, the liquid may be placed into any suitable container, for example, a spray bottle. The spray bottle may be held a suitable distance from the material to be sprayed, say, about 6-10 inches or more depending on the configuration of the sprayer, and the material sprayed with the composition until all intended surfaces are saturated, for example, approximately seventy-five square feet per quart.

Figure 1:
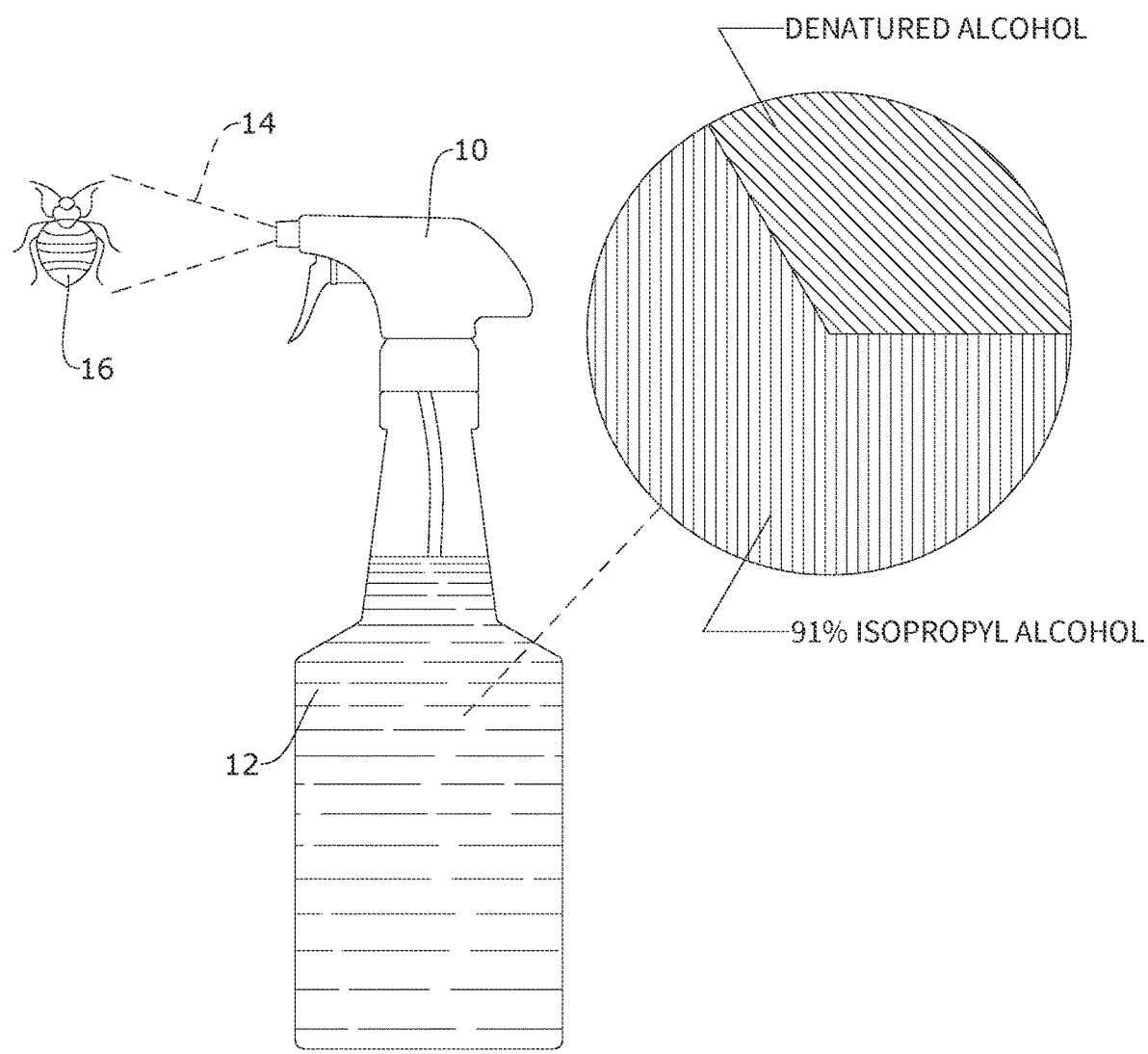
FIG. 1 is a schematic view illustrating a method of treating a bed bug infested area according to an embodiment of the present invention.
Figure 2:
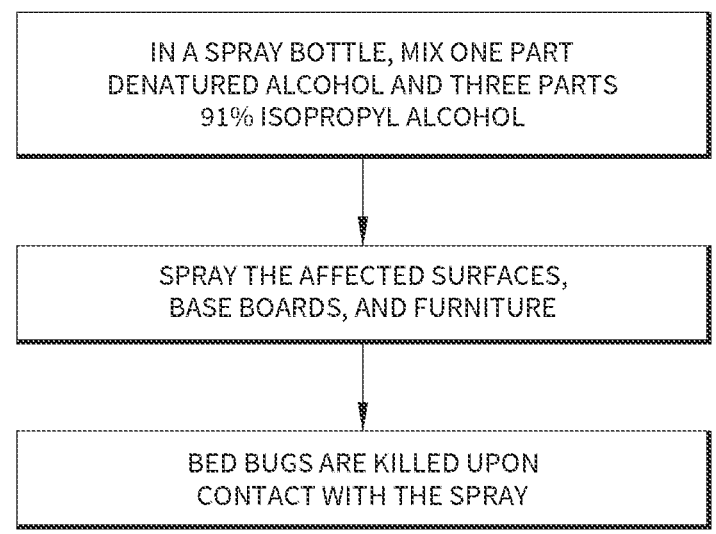
FIG. 2 is a flow chart thereof.

Referring to FIGS. 1 and 2, FIG. 1 shows a spray bottle 10 containing a formula 12 comprising ⅓ by volume denatured alcohol and ⅔ by volume 91% isopropyl alcohol. A spray 14 of the formula 12 from the spray bottle 10 is shown applied to a bed bug 16. FIG. 2 provides a flow chart of method steps including mixing the alcohol components of the formula 12, spraying affected surfaces, and thereby killing bed bugs on contact.

It should be understood, of course, that the foregoing relates to exemplary embodiments of the invention and that modifications may be made without departing from the spirit and scope of the invention as set forth in the following claims.

What is claimed is:

1. A method of treating an area infested with bed bugs, comprising:
    applying to the infested area an amount of an isopropyl alcohol-denatured alcohol blend effective to kill the bed bugs;
    wherein only the isopropyl alcohol and the denatured alcohol are applied to the infested area.

2. The method of claim 1, wherein the isopropyl alcohol-denatured alcohol blend is applied as a spray.

3. The method of claim 1, wherein the isopropyl alcohol and the denatured alcohol are pesticidal ingredients and are the only pesticidal ingredients applied to the infested area.

4. The method of claim 1, wherein the isopropyl alcohol-denatured alcohol blend contains about 1 part by volume denatured alcohol to about two parts by volume 91 percent by volume isopropyl alcohol.

5. A bed bug control composition comprising, in volume percentages based on a total volume of the bed bug control composition:
    25% to 33% denatured alcohol; and
    66% to 75% isopropyl alcohol.

6. The bed bug control composition of claim 5, wherein the composition is formulated as a spray.

7. The bed bug control composition of claim 5, wherein the composition comprises only the isopropyl alcohol and the denatured alcohol.

* * * * *